United States Patent [19]

Orter

[11] 4,329,977
[45] May 18, 1982

[54] ROTATABLE COOKER

[76] Inventor: Ralph H. Orter, P.O. Box 2074, Prescott, Ariz. 86301

[21] Appl. No.: 4,731

[22] Filed: Jan. 18, 1979

[51] Int. Cl.³ .................. B65D 8/00; B65D 6/12
[52] U.S. Cl. ..................... 126/369; 99/415; 220/4 B; 220/8; 220/19; 220/94 R
[58] Field of Search ............... 126/369; 220/8, 19, 220/326, 4 B, 94 R, 94 A, 94 B, ; 99/450, 415; D7/94, 96, 97

[56] References Cited

U.S. PATENT DOCUMENTS

| D. 59,953 | 12/1921 | Church | D7/97 |
| D. 250,803 | 1/1979 | Elliott et al. | D7/97 |
| 1,237,580 | 8/1917 | Tashima | 99/415 |
| 1,701,384 | 2/1929 | McGarvey | D7/97 X |
| 2,081,925 | 6/1937 | Graf | 220/94 R X |
| 2,743,838 | 5/1956 | Peterson | 220/19 |

FOREIGN PATENT DOCUMENTS

| 1317671 | 1/1963 | France | 220/94 R |
| 526773 | 5/1955 | Italy | 220/19 |

*Primary Examiner*—Stephen P. Garbe

[57] ABSTRACT

The present invention relates to an adjustable and rotatable stovetop cooker having two telescoping halves. Each half also includes opposed handles which allow the cooker to be picked up and rotated 180 degrees to allow cooking a package of food on both sides.

1 Claim, 3 Drawing Figures

ROTATABLE COOKER

OBJECTS OF THIS INVENTION

An object of this invention is to provide a simple, inexpensive, adjustable and rotatable stovetop cooker made of material that readily admits heat therein. It is a further object of this invention to provide a cooker that is adjustable to accomodate varying size food packages placed therein and a cooker that is rotatable to cook both sides of said food package.

SUMMARY OF THE INVENTION

This invention is directed to an adjustable and rotatable stovetop cooker which comprizes only two members, the upper, slightly wider member of which travels over the lower member either partially or completely to adjust to varying size food packages placed therein. It is provided with handles on opposite sides thereof so that it may be rotated one half turn to cook both sides of the food package.

Figure 1:
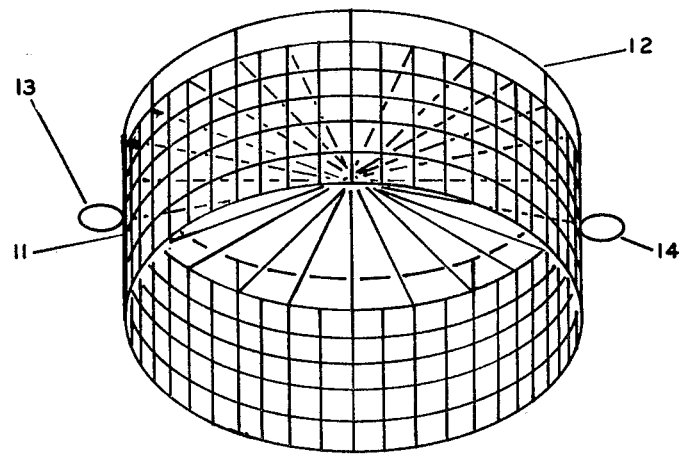
FIG. 1 is a side elevation of the slightly wider, upper member of the adjustable and rotatable stovetop cooker.
Figure 2:
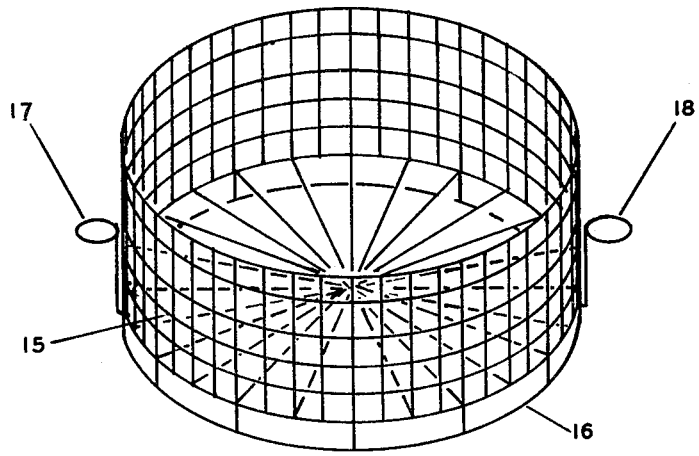
FIG. 2 is a side elevation of the lower member of the adjustable and rotatable stovetop cooker.
Figure 3:
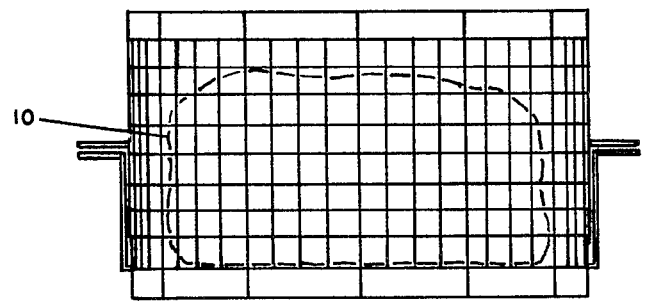
FIG. 3 is a side elevation of the cooker with the upper member positioned over the lower member with a food package therein.

This invention is directed to an adjustable and rotatable stovetop cooker, shown in FIG. 3, comprising two similar members made of open type materials that freely admit heat into the cooker. The upper, slightly wider member 11 shown in FIG. 1 is provided with an elevating base 12 which is attached to the periphery of the closed end of said upper member to space the cooker above the heat and provide a sturdy base when it is rotated. The upper member is also provided with handles 13-14 which are located on opposite sides thereof and attached at points which are approximately halfway between the open and closed ends of said member. The lower member 15 shown in FIG. 2 is provided with an elevating base 16 that is attached to the periphery of the closed end of said lower member to space the cooker above the heat and provide a sturdy base. The lower member is provided with handles 17-18 on opposite sides thereof. The handles include elongated members, the lower ends of which are attached to the exterior of the closed end of said lower member. The elongated members extend outwardly slightly and then upright to a height approximately even with the center of said lower member at which point outwardly extending grasping handle members are attached thereto. When the handles on each side are grasped and forced toward each other, the closed end of the upper and lower members engage and hold the food package 10 in place during rotation of the cooker.

What is claimed is:

1. An adjustable and rotatable stovetop cooker of open mesh material comprising a first, or upper half and a second, or lower half, said first half having a cross-sectional area slightly greater than that of the second half to allow the halves to be telescopingly engaged, each of said halves having an open end and a closed end, each of said ends including a base member extending around the periphery thereof and extending outwardly thereform so as to space each of said ends from a supporting surface when its corresponding base member is placed thereon, said first half including two first handle members located on opposing portions thereof and extending outwardly from said half, said first handle members being located about halfway between the closed and open ends of said first half, said second half including two second, elongated handle members, each of which includes a grasping portion, and an elongated portion, the elongated portions having first and second ends and being attached at their first ends to the second base member at opposing portions thereof and extending toward the open end of the second half, said elongated portions being located on the outside of, and spaced from, the exterior of the second half so as to allow the first half to slide therebetween, the second ends of the elongated portions being attached to the grasping portions, the grasping portions being so spaced from the open end of the second half as to be in spaced, opposing relationship to the first handle members when the first and second halves are telescopingly engaged.

* * * * *